(12) United States Patent
Wu

(10) Patent No.: US 7,546,449 B2
(45) Date of Patent: *Jun. 9, 2009

(54) COMPUTER ARCHITECTURE WITH MULTIPLE OPERATING SYSTEMS USING A COMMON DISC PARTITION AND METHOD FOR THE SAME

(75) Inventor: Alex Wu, Taipei (TW)

(73) Assignee: Corel TW Corp., Taipei (TW)

( * ) Notice: Subject to any disclaimer, the term of this patent is extended or adjusted under 35 U.S.C. 154(b) by 633 days.

This patent is subject to a terminal disclaimer.

(21) Appl. No.: 11/048,821

(22) Filed: Feb. 3, 2005

(65) Prior Publication Data

US 2006/0123201 A1 Jun. 8, 2006

(30) Foreign Application Priority Data

Dec. 3, 2004 (TW) .............................. 93137354 A

(51) Int. Cl.
*G06F 9/00* (2006.01)
(52) U.S. Cl. .......................................... 713/2; 713/100
(58) Field of Classification Search ...................... 713/2, 713/100
See application file for complete search history.

(56) References Cited

U.S. PATENT DOCUMENTS 6,928,542 B2 * 8/2005 Wen et al. ...................... 713/2

2006/0064688 A1 * 3/2006 Tseng ............................ 718/1

FOREIGN PATENT DOCUMENTS

EP 1686468 A1 * 8/2006

OTHER PUBLICATIONS

Matt Welsh, Matthias Kalle Dalheimer, and Lar Kaufman, Running Linux, Aug. 1999, O'Reilly & Associates, 3rd Edition, Appendix D, sections D.3-D.3.3.*

* cited by examiner

*Primary Examiner*—Thomas Lee
*Assistant Examiner*—Albert Wang
(74) *Attorney, Agent, or Firm*—Rosenberg, Klein & Lee

(57) ABSTRACT

A computer architecture with multiple operating systems (OS) using a common disc partition and a method for the same are proposed. The computer architecture includes: a first operating system having a file system used to store a second operating system; a random access memory (RAM) disc, wherein the RAM disc is a virtual storage device composed of partial memory of a memory unit and the second operating system can be executed in the RAM disc; and a basic input/output system (BIOS) used to control a booting procedure of a computer system and load the second operating system into the RAM disc. Therein, the second operating system can use parameter information and a multimedia playback system of the first operating system directly via an interface unit.

31 Claims, 5 Drawing Sheets

COMPUTER ARCHITECTURE WITH MULTIPLE OPERATING SYSTEMS USING A COMMON DISC PARTITION AND METHOD FOR THE SAME

BACKGROUND OF THE INVENTION

1. Field of the Invention

The present invention is related to a computer architecture with multiple operating systems (OS) using a common disc partition and a method for the same, and more particularly, to a computer architecture having a first operating system and a second operating system, in which the second operating system is stored in a file system of the first operating system and the second operating system can be installed in a RAM disc for execution via a basic input/output system (BIOS). Thus, the first and second operating systems can use the same disc partition of a storage device.

2. Description of Related Art

Since operating systems were developed, Linux operating system and Windows operating system have become the main streams of the operating systems. Regarding Linux operating system, it was issued in the autumn of 1990. Because the development of Linux operating system is later than that of Window operating system, there are still a lot of problems existing in Linux operating system that need to be overcome. For example, Linux operating system is short for various program libraries for product development, drivers for peripheral devices, man-machine interfaces, related software and so forth. Thus, the universality and compatibility of Linux operating system for existent chips and platforms are not sufficient. Hence, developing Linux related technologies needs a lot of time for fumble and cost for redevelopment.

As for Windows operating system, it was developed by the greatest software company, Microsoft Company. Hence, Windows operating system has various program libraries, drivers for peripheral devices, man-machine interfaces and related software. It can well support all kinds of chips or platforms almost. Besides, Windows operating system can be arranged, managed and used easily. It can also provide reliability and compatibility at enterprise level. One can easily built up a dynamical enterprise network and an Internet web site, use program servers integratedly and lower the cost for software support.

Although Windows operating system can provide abundant system resources, it increases the burden of computer systems. When a computer is turned on to activate Window operating system installed therein, it needs to consume a lot of time for activation of Window operating system. On the contrary, if Linux operating system is used, the computer only needs to install the kernel of Linux operating system and some necessary programs of the user end. Thus, Linux operating system can be activated faster that Windows operating system.

In general, Linux operating system and Windows operating system use different kinds of file systems. Windows operating system uses the file system complied with FAT32 standard, while Linux operating system uses the file system complied with ext2 standard. If one wants to install these two operating systems in the same storage device, he needs to divide the storage space of the storage device into two different partitions in advance. Then, he needs to format these two disc partitions respectively according to two different file systems, i.e. FAT32 file system and ext2 file system. Lastly, he can install Linux operating system and Windows operating system respectively into suitable disc partitions. After one installs Linux operating system and Windows operating system, he can further install software related respectively to these two operating systems into these two disc partitions.

When one of these two installed operating systems is used, the other one becomes unavailable. Meantime, the storage space of the disc partition for the other operating system also becomes unavailable. That is a waste. Furthermore, the same application programs may be reinstalled into these two different disc partitions. That wastes the system resource. Hence, how to make these two operating systems exist in the same disc partition and keep them functioning well is a task that should be dealt with.

All data need to be stored in the storage device. Operating systems are not an exception. When an operating system and its related data are used, they should be loaded into a memory unit from the storage device for execution. However, sometimes the loaded program is too large or too many programs are loaded and the capacity of the memory unit is not sufficient. In order to solve this problem, a common method is to use a part of the storage space of the storage device to store the excess portion, which is usually some programs not in working status or some data that doesn't need to be accessed temporarily. When the host computer needs to deal with these data or run these programs, it will load these data or programs into the memory unit and move other data or programs that do not need to be used temporarily from the memory unit back to the storage device. This operation is called "swapping". However, if the capacity of the memory unit is too small, the host computer should transfer the data or programs between the storage device, e.g. hard disk, and the memory unit frequently. That lowers the execution efficiency greatly.

With the progress of information technologies, the capacity of the memory units is effectively increased. That makes the execution efficiency of computer systems increase unceasingly. For this sake, a concept of random access memory (RAM) disks was proposed. It suggests using partial memory of a RAM to form a virtual disc device. By using the feature that the access speed of the RAM is much faster than that of a hard disc, the data or programs accessed frequently can be loaded to the virtual disc device to increase the execution efficiency.

Therefore, how to provide a computer architecture with multiple operating systems (OS) using a common disc partition and a method for the same to remove the drawbacks of the prior art has been desired for a long time. In view of the research, development and practical sale experiences of the related products for many years, the inventor of the present invention sought to improve the prior art. Via inventor's professional knowledge and his research, design and case study in many ways, the inventor finally proposes a computer architecture and a method thereof. Via the present invention, one doesn't need to divide the memory of a disc device (e.g. hard disc) into two disc partitions to install two different operating systems. The present invention can make two different operating systems use the same disc partition and keep them functioning well. Furthermore, the present invention uses a virtual disc device to increase the execution speed and is capable of making two different operating systems able to use the system resources of each other via an interface unit. Thus, using the present invention can remove the drawbacks of the prior art indeed.

SUMMARY OF THE INVENTION

An objective of the present invention is to provide a computer architecture with multiple operating systems (OS) using a common disc partition and a method for the same. The present invention uses a basic input/output system (BIOS) to load a second operating system stored in a file system of a first operating system into a virtual disc device (e.g. RAM disc) for execution. Thus, the first and second operating systems can use the same disc partition of a disc storage device (e.g. hard disc).

Another objective of the present invention is to provide a computer architecture to increase the execution efficiency. The present invention uses basic input/output system (BIOS) to load the second operating system to the virtual disc device (e.g. RAM disc). Since the access speed of the virtual disc device is faster than a common storage device (e.g. hard disc), the present invention can increase the execution efficiency.

Still another objective of the present invention is to provide a computer architecture that can make two different operating systems capable of using the system resources of each other. The present invention uses an interface unit for conversion of parameter information and a multimedia playback system of the first operating system so that the second operating system can use the parameter information and the multimedia playback system of the first operating system directly. In this way, one doesn't need to activate the first operating system that has a longer initialization period to use the parameter information or the multimedia playback. He can directly activate the second operating system to use the parameter information or the multimedia playback of the first operating system. Thus, the present invention can shorten the initialization time and fulfill user's requirements is a faster way. Besides, since the second operating system of the present invention can share the system resources of the first operating system via the interface unit, the present invention can effectively reduce the waste of memory because the present invention doesn't need to install the same software or record the same parameter information in the second operating system.

For achieving the objectives above, the present invention provides a computer architecture with multiple operating systems (OS) using a common disc partition and a method for the same. Therein, the computer architecture includes: a first operating system to store a second operating system; a random access memory (RAM) disc, wherein the RAM disc is a virtual storage device composed of partial memory of a memory unit and the second operating system can be executed in the RAM disc; and a basic input/output system (BIOS) used to control a booting procedure of a computer system and load the second operating system into the RAM disc. The second operating system can use an interface unit to convert the parameter information and the multimedia playback system of the first operating system. Hence, the second operating system can use the parameter information and the multimedia playback system directly via the interface unit. Furthermore, since the second operating system is loaded to the RAM disc, which has higher access speed than disc storage devices (e.g. hard discs), the execution efficiency can be effectively improved. Besides, one can activate the second operating system, whose burden of system resources is less, instead of the first operating system, whose burden of system resources is larger. Thus, the initialization time of the computer system can be reduced and the storage space can be saved.

Numerous additional features, benefits and details of the present invention are described in the detailed description, which follows.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF PREFERRED EMBODIMENTS

Figure 1:
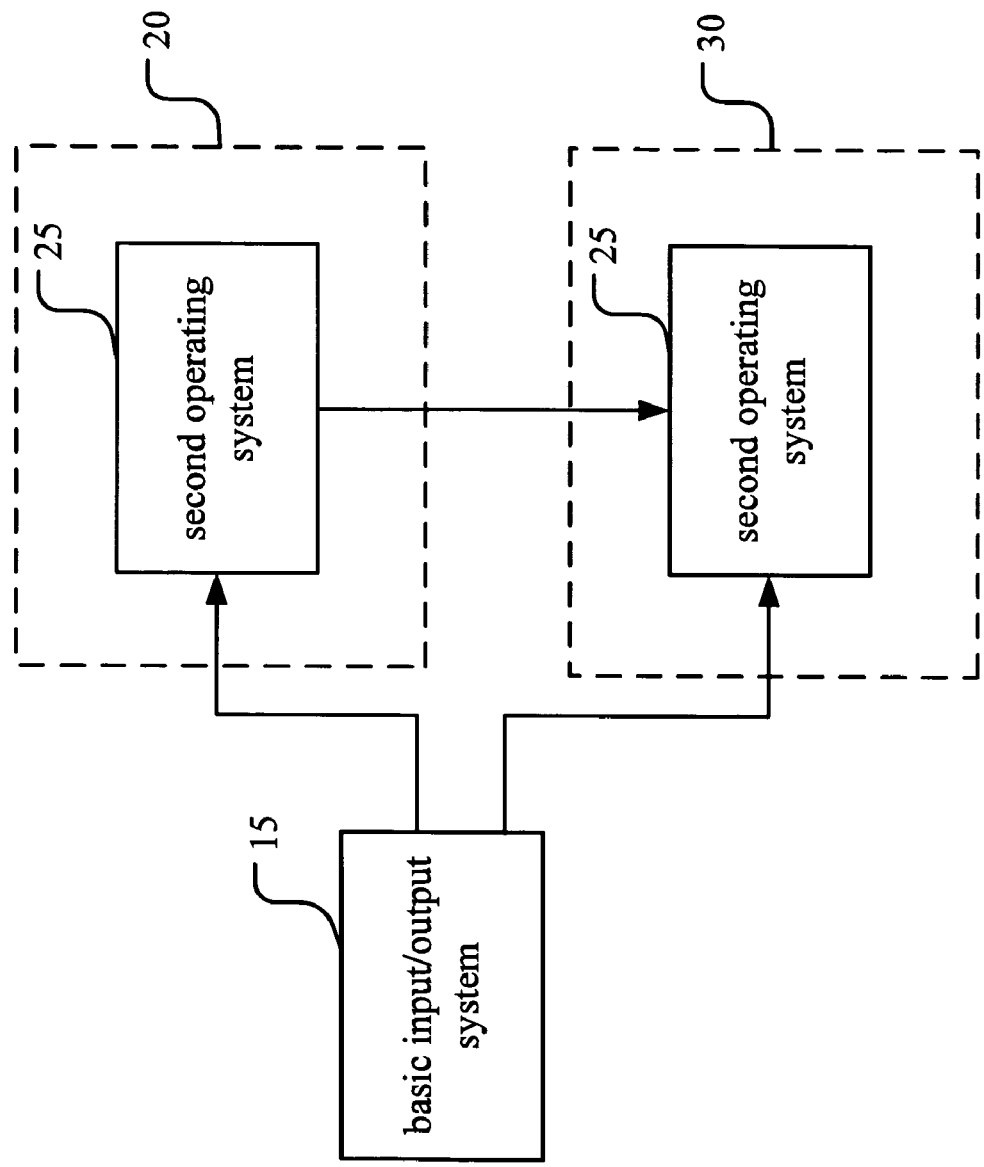
FIG. 1 is a schematic diagram illustrating that multiple operating systems are installed in the same disk partition in accordance with the present invention.

Reference is made to FIG. 1, which is a schematic diagram illustrating that multiple operating systems are installed in the same disk partition in accordance with the present invention. As shown in the figure, the present invention has a basic input/output system (BIOS) 15, a first operating system (OS) 20, a second operating system (OS) 25 and a RAM disc 30. The first operating system 20 has a file system to store the second operating system 25. The RAM disc 30 is a virtual storage device composed of partial memory of a memory unit, e.g. DRAM. The BIOS 15 is used to control the booting procedure of a computer system. The BIOS 15 can be used to install the second operating system 25 to the RAM disc 30 to run the second operating system 25. Thus, one doesn't need to partition the memory space of the storage device to provide a dedicated disc partition for the second operating system 25. The first operating system 20 and the second operating system 25 can use the same disc partition. In addition, since the operating system can be accessed directly from the memory unit in the present invention and the access speed of the memory unit is faster than a hard disc, the present invention has better efficiency than the prior art that access the operating system from a hard disc.

The foresaid first operating system 20 can be a Windows operating system, which has a great quantity of system resources, such as Windows XP, Windows NT, Windows 98, Windows 2000 and Window ME. The second operating system 25 can be a Linux operating system, which has fewer system resources.

The foresaid second operating system 25 can be a compressed file, an executive file or an image file. The BIOS 15 can have a decompressor. It can first decompress the file of the second operating system 25 and then install the second operating system into the RAM disc 30. Therein, the BIOS 15 can be customized by modifying its setting file. Thus, the BIOS 15 can determine which operating system should be booted. It can boot the first operating system 20 or the second operating system 25 that stored in the file system of the first operating system 20. If the second operating system 25 is chosen, the BIOS 15 will install the second operating system 25 into the RAM disc 30 directly and run it. In this way, the present invention doesn't need to waste time to booting the first operating system 20, which has a greater quantity of system resources.

Figure 2:
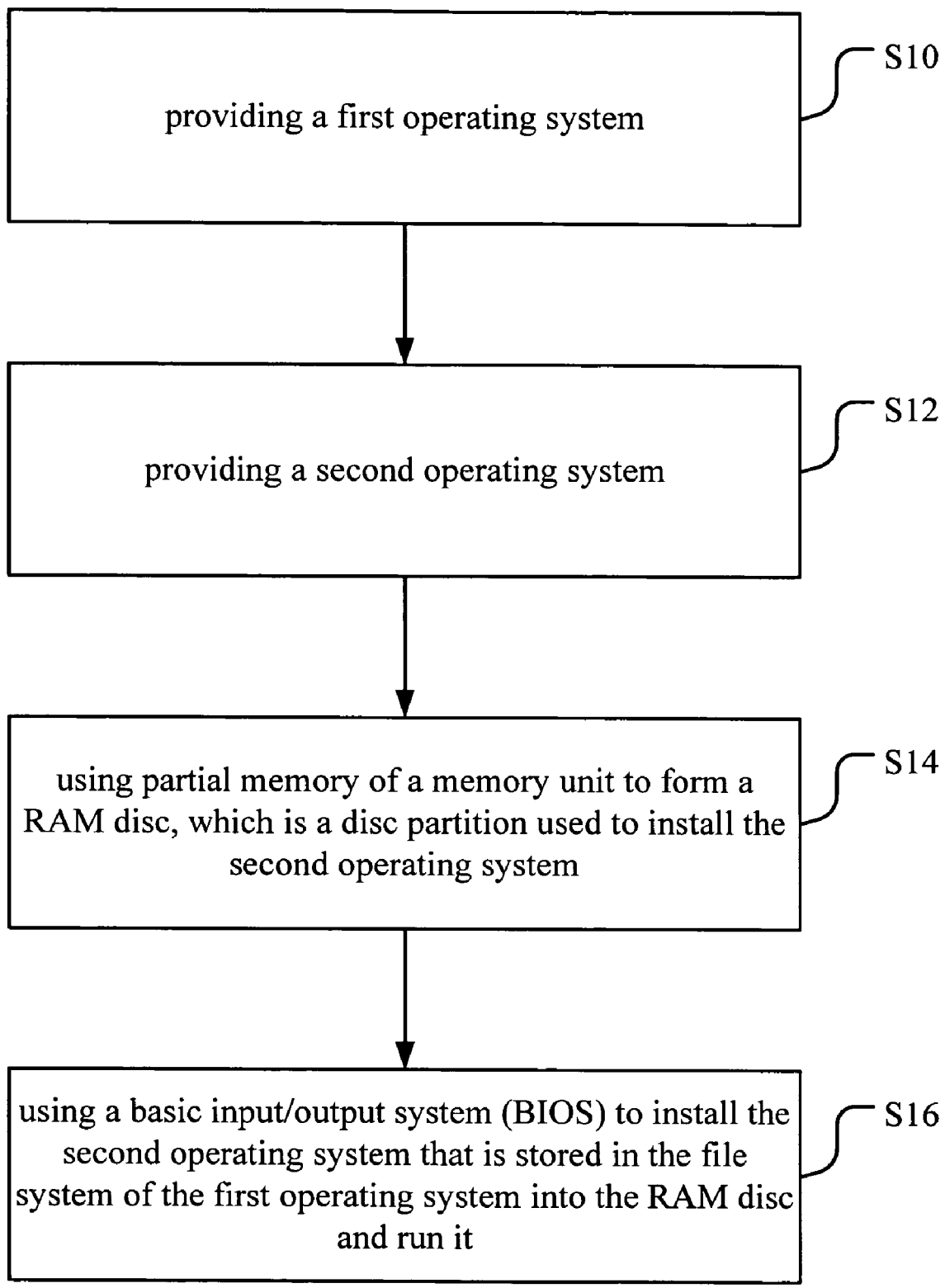
FIG. 2 is a flow chart for illustration of multiple operating systems using a common disc partition in accordance with the present invention.

Reference is made to FIG. 2, which is a flow chart for illustration of multiple operating systems using a common disc partition in accordance with the present invention. As shown in the figure, the method of the present invention includes following steps:

Step S10: providing a first operating system, which has a file system;

Step S12: providing a second operating system, which is stored in the file system of the first operating system;

Step S14: using partial memory of a memory unit to form a RAM disc, which is a disc partition used to install the second operating system; and Step S16: using a basic input/output system (BIOS) to install the second operating system that is stored in the file system of the first operating system into the RAM disc and run it.

Figure 3:
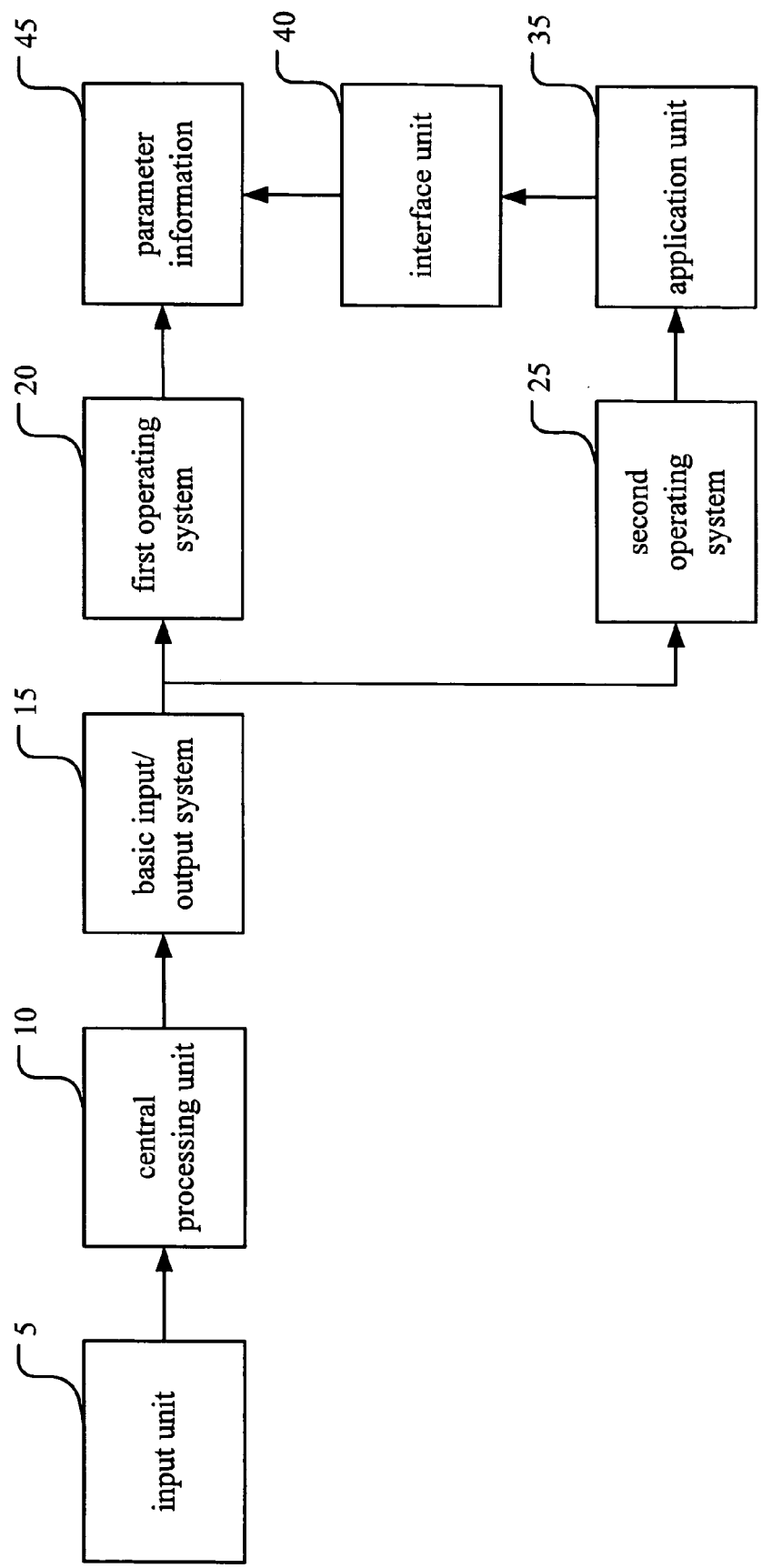
FIG. 3 is a block diagram for illustration of multiple operating systems sharing their resources under the computer architecture having the multiple operating systems using the same disc partition in accordance with the present invention.

Reference is made to FIG. 1 together with FIG. 3, which is a block diagram for illustration of multiple operating systems sharing their resources under the computer architecture having the multiple operating systems using the same disc partition in accordance with the present invention. As shown in the figure, the present invention has an input unit 5, a central processing unit (CPU) 10, the basic input/output system (BIOS) 15, the first operating system 20, the second operating system 25, an application unit 35, an interface unit 40 and parameter information 45. Therein, the input unit 5 is used to issue a command to the CPU 10 to drive the BIOS 15 to install the second operating system 25 stored in the file system of the first operating system 20 into the RAM disc 30 for execution. Meantime, the application unit 35 operating under the environment provided by the second operating system 25 can access the parameter information 45 via the interface unit 40. The interface unit 40 is used to convert the parameter information 45 for usage of the second operating system 25. Thus, the same software doesn't need to be installed in both of these two operating systems. It only needs to be installed in one of the operating systems. In this way, the present invention can reduce the waste in storage space and make the first and second operating systems share their resources.

The foresaid parameter information 45 can be video information and the application unit 35 can be a multimedia playback system. The application unit 35 can share the video information of the first operating system 20 via the interface unit 40.

Figure 4:
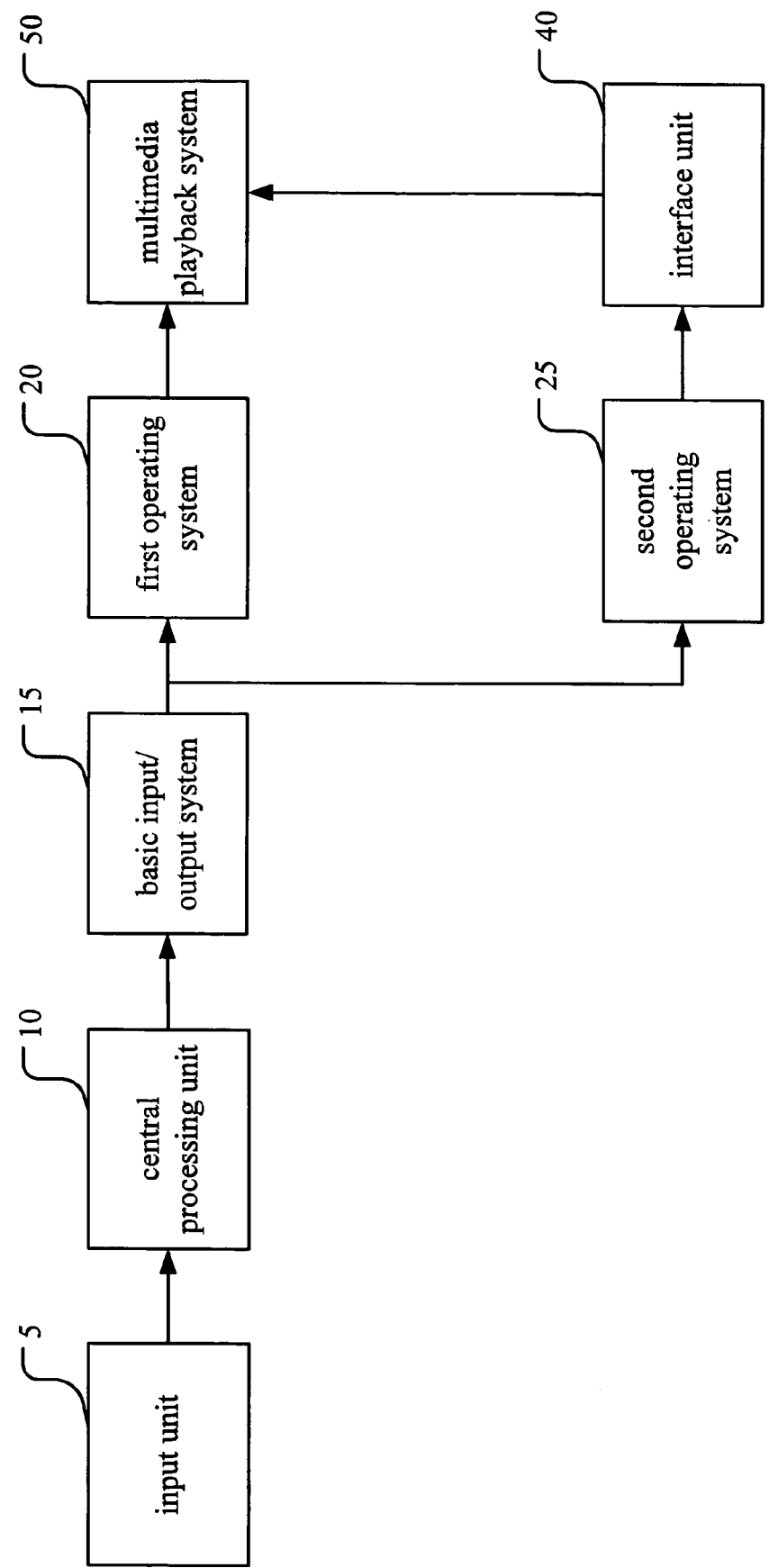
FIG. 4 is a block diagram for illustration of multiple operating systems sharing their resources under the computer architecture having the multiple operating systems using the same disc partition in accordance with another preferred embodiment of the present invention.

Reference is made to FIGS. 1, 3 together with FIG. 4, which is a block diagram for illustration of multiple operating systems sharing their resources under the computer architecture having the multiple operating systems using the same disc partition in accordance with another preferred embodiment of the present invention. As shown in the figure, the present invention has the input unit 5, the central processing unit (CPU) 10, the basic input/output system (BIOS) 15, the first operating system 20, the second operating system 25, the interface unit 40 and a multimedia playback system 50. Therein, the input unit 5, the CPU 10, the BIOS 15, the first operating system 20 and the second operating system 25 are the same as that shown in FIG. 1 or 3. The multimedia playback system 50 operates under the environment provided by the first operating system 20 and is used to play video information. The interface unit 40 is used to convert the multimedia playback system 50 so that the second operating system 25 can share the multimedia playback system 50.

When one turns on a computer only for playing video files, he can use the present invention to boot the second operating system 25 that has less system resources. Then, the second operating system 25 can drive the interface unit 40 to convert the parameter information related to the multimedia playback system 50. Thereby, one can use the multimedia playback system 50 to play the video information right after the second operating system is booted in the computer. Thus, the present invention can fulfill user's requirements in a faster way.

Figure 5:
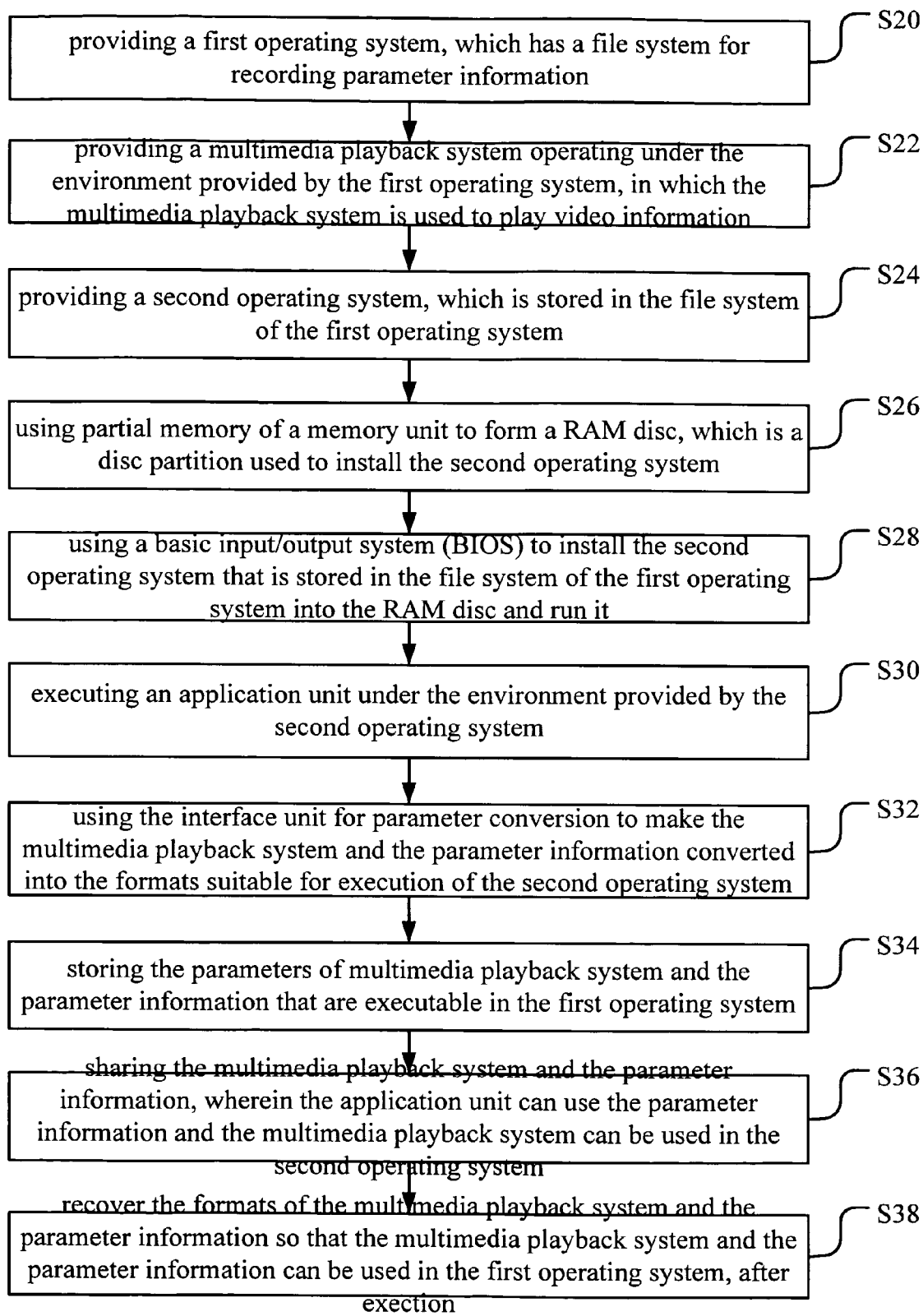
FIG. 5 is flow chart for illustration of multiple operating systems sharing their resources under the computer architecture having the multiple operating systems using the same disc partition in accordance with a preferred embodiment of the present invention.

Reference is made to FIG. 5, which is flow chart for illustration of multiple operating systems sharing their resources under the computer architecture having the multiple operating systems using the same disc partition in accordance with a preferred embodiment of the present invention. As shown in the figure, the method of the present invention has following steps:

Step S20: providing a first operating system, which has a file system for recording parameter information;

Step S22: providing a multimedia playback system operating under the environment provided by the first operating system, in which the multimedia playback system is used to play video information;

Step S24: providing a second operating system, which is stored in the file system of the first operating system;

Step S26: using partial memory of a memory unit to form a RAM disc, which is a disc partition used to install the second operating system;

Step S28: using a basic input/output system (BIOS) to install the second operating system that is stored in the file system of the first operating system into the RAM disc and run it;

Step S30: executing an application unit under the environment provided by the second operating system;

Step S32: using the interface unit for parameter conversion to make the multimedia playback system and the parameter information converted into the formats suitable for execution of the second operating system;

Step S34: storing the parameters of multimedia playback system and the parameter information that are executable in the first operating system;

Step S36: sharing the multimedia playback system and the parameter information, wherein the application unit can use the parameter information and the multimedia playback system can be used in the second operating system; and Step S38: after execution, recover the formats of the multimedia playback system and the parameter information so that the multimedia playback system and the parameter information can be used in the first operating system.

Summing up, present invention is related to a computer architecture with multiple operating systems (OS) using a common disc partition and a method for the same. One can use the present invention for booting of a computer via a basic input/output system (BIOS). The BIOS of the present invention can load the second operating system stored in the file system of the first operating system into a RAM disc, which is composed of partial memory of a memory unit (e.g. DRAM), and run it. Thus, the storage device, e.g. hard disc, doesn't need to be partitioned to provide a dedicated memory space for the second operating system. Since the second operating system can be accessed directly from the memory unit in the present invention and the access speed of the memory unit is faster than a hard disc, the operation speed of the second operating system installed in the RAM disc can be improved.

Furthermore, the interface of the present invention can perform the action of parameter conversion for the parameter information and the multimedia playback system of the first operating system. Thus, the second operating system can share the resources of the first operating system so that the same software doesn't need to be installed in both of the first and second operating systems. Thereby, the present invention can reduce the waste in storage space and make the first and second operating systems able to share the resources of each other.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are embraced within the scope of the invention as defined in the appended claims.

What is claimed is:

1. A computer architecture with operating systems using a common disc partition, the computer architecture comprising:
   a first operating system having a file system;
   a second operating system stored in the file system of the first operating system;
   a random access memory (RAM) disc, which is a virtual storage device composed of partial memory of a memory unit; and
   a basic input/output system (BIOS) used to control a booting procedure of a computer system and load the second operating system into the RAM disc.

2. The computer architecture as claimed in claim 1, wherein the second operating system is a compressed file.

3. The computer architecture as claimed in claim 1, wherein the second operating system is an executable file.

4. The computer architecture as claimed in claim 1, wherein the second operating system is an image file.

5. The computer architecture as claimed in claim 1, wherein the first operating system has more system resources than the second operating system.

6. A method for making multiple operating systems able to use a common disc partition, the method comprising:
   providing a first operating system having a file system;
   providing a second operating system stored in the file system of the first operating system; and
   using a basic input/output system (BIOS) to load the second operating system into the RAM disc for execution.

7. The method as claimed in claim 6, further comprising:
   compressing the second operating system to form a compressed file after the step of providing the First operating system.

8. The method as claimed in claim 7, further comprising:
   using the BIOS to decompress the compressed file.

9. The method as claimed in claim 6 further comprising:
   compressing the second operating system to form an executable file after the step of providing the first operating system.

10. The method as claimed in claim 9, further comprising:
    using the BIOS to execute the executable file.

11. A computer architecture with operating systems using a common disc partition, the computer architecture comprising:
    a first operating system having a file system for recording parameter information;
    a second operating system stored in the file system of the first operating system;
    an application unit operating in an environment provided by the second operating system;
    a random access memory (RAM) disc, which is a virtual storage device composed of partial memory of a memory unit; and
    a basic input/output system (BIOS) used to control a booting procedure of a computer system and load the second operating system into the RAM disc;
    wherein the application unit uses the parameter information of the first operating system via an interface unit that is capable of performing a conversion of the parameter information.

12. The computer architecture as claimed in claim 11, wherein the application unit is a multimedia playback system used to play video information.

13. The computer architecture as claimed in claim 11, wherein the second operating system is a compressed file.

14. The computer architecture as claimed in claim 11, wherein the second operating system is an executable file.

15. The computer architecture as claimed in claim 11, wherein the second operating system is an image file.

16. The computer architecture as claimed in claim 11, wherein the first operating system has more system resources than the second operating system.

17. A method for making multiple operating systems able to use a common disc partition, the method comprising:
    providing a first operating system having a file system;
    providing parameter information stored in the file system of the first operating system;
    providing a second operating system stored in the file system of the first operating system;
    using a basic input/output system (BIOS) to load the second operating system into the RAM disc for execution;
    executing an application unit in an environment provided by the second operating system; and
    using an interface unit for conversion of the parameter information to make the parameter information suited to be used by the application unit.

18. The method as claimed in claim 17, further comprising:
    compressing the second operating system to form a compressed file after the step of providing the first operating system.

19. The method as claimed in claim 18, further comprising:
    using the BIOS to decompress the compressed file.

20. The method as claimed in claim 17 further comprising:
    compressing the second operating system to form an executable file after the step of providing the first operating system.

21. The method as claimed in claim 20, further comprising:
    using the BIOS to execute the executable file.

22. A computer architecture with operating systems using a common disc partition, the computer architecture comprising:
    a first operating system having a file system;
    a multimedia playback system operating in an environment provided by the first operating system to play video information;
    a second operating system stored in the file system of the first operating system;
    a random access memory (RAM) disc, which is a virtual storage device composed of partial memory of a memory unit; and
    a basic input/output system (BIOS) used to control a booting procedure of a computer system and load the second operating system into the RAM disc;
    wherein the second operating system uses an interface unit to convert the multimedia playback system so that the multimedia playback system is capable of operating in an environment provided by the second operating system.

23. The computer architecture as claimed in claim 22, wherein the second operating system is a compressed file.

24. The computer architecture as claimed in claim 22, wherein the second operating system is an executable file.

25. The computer architecture as claimed in claim 22 wherein the second operating system is an image file.

26. The computer architecture as claimed in claim 22, wherein the first operating system has more system resources than the second operating system.

27. A method for making multiple operating systems able to use a common disc partition, the method comprising:
providing a first operating system having a file system;
providing a multimedia playback system operating in an environment provided by the first operating system to play video information;
providing a second operating system stored in the file system of the first operating system;
using a basic input/output system (BIOS) to load the second operating system into the RAM disc for execution; and
using an interface unit to convert the multimedia playback system so that the multimedia playback system is capable of operating in an environment provided by the second operating system.

28. The method as claimed in claim 27, further comprising:
compressing the second operating system to form a compressed file after the step of providing the first operating system.

29. The method as claimed in claim 28, further comprising:
using the BIOS to decompress the compressed file.

30. The method as claimed in claim 27 further comprising:
compressing the second operating system to form an executable file after the step of providing the first operating system.

31. The method as claimed in claim 30, further comprising:
using the BIOS to execute the executable file.

* * * * *